United States Patent [19]

Nakamura et al.

[11] Patent Number: 4,637,774
[45] Date of Patent: Jan. 20, 1987

[54] INDUSTRIAL ROBOT

[75] Inventors: Hiroshi Nakamura; Osamu Toyama, both of Kariya; Norikazu Kanii, Chita, all of Japan

[73] Assignee: Toyoda Koki Kabushiki Kaisha, Kariya, Japan

[21] Appl. No.: 701,305

[22] Filed: Feb. 13, 1985

[30] Foreign Application Priority Data

Feb. 29, 1984 [JP] Japan .................................. 59-39525
Mar. 1, 1984 [JP] Japan .................................. 59-39832
Mar. 6, 1984 [JP] Japan .................................. 59-43396

[51] Int. Cl.$^4$ .............................................. B25J 9/00
[52] U.S. Cl. .................................. 414/735; 74/665 E; 414/744 A; 901/29
[58] Field of Search ............... 414/735, 744 A–744 C; 901/15, 25–29; 74/665 A–665 E, 417

[56] References Cited

U.S. PATENT DOCUMENTS

| 3,922,930 | 12/1975 | Fletcher et al. | 901/29 X |
| 4,068,536 | 1/1978 | Stackhouse | 901/29 X |
| 4,076,131 | 2/1978 | Dahlstrom et al. | 214/1 BC |
| 4,548,097 | 10/1985 | Zimmer | 414/735 X |

FOREIGN PATENT DOCUMENTS 58-41996 9/1983 Japan .

Primary Examiner—Robert J. Spar
Assistant Examiner—Donald W. Underwood
Attorney, Agent, or Firm—Oblon, Fisher, Spivak, McClelland & Maier

[57] ABSTRACT

An industrial robot having a first arm pivotable about an axis and a second arm carried on one end of the first arm for pivot movement about an axis which is parallel to the pivot axis of the first arm. The second arm is composed of an arm body, which carries a rotary member rotatable about an axis normal to the pivot axis of the second arm. A twist body secured to one axial end of the rotary member carries a bend body rotatable about an oblique axis which is slanted with respect to the rotational axis of the rotary member, and the bend body carries a swivel body rotatable about an axis which is slanted with respect to the oblique axis. The twist body is formed at a portion radially offset from the rotational axis of the rotary member with an eccentric cylindrical portion, in which a first pair of shafts for transmitting rotational power respectively to the bend and swivel bodies are rotatably carried in approximately coaxial alignment with each other. Further, a second pair of shafts for respectively rotating the first pair of shafts are rotatably carried in the rotary member, with one of them being in coaxial relation with the rotational axis of the rotary member, but with the other of them being in coaxial relation with one of said first pair of shafts.

8 Claims, 6 Drawing Figures

INDUSTRIAL ROBOT

BACKGROUND OF THE INVENTION

1. Field of the Invention:

The present invention relates to an industrial robot of the type wherein a wrist section thereof has a freedom of movements along three axes.

2. Description of the Prior Art:

In a known industrial robot having a freedom of movements along six axes, a twist body is rotatably carried at one end of an arm body, a bend body is carried at one end of the twist body for rotation about an axis which is slanted with respect to the rotational axis of the twist body, and a swivel body is carried on the bend body for rotation about an axis which is slanted with respect to the rotational axis of the bend body. The known robot is accompanied by a problem that the working range of the bend body is diminished to avoid the interference between the twist body and the bend body.

In order to enlarge the working range of the bend body, it is effective to provide the front end of the twist body with an eccentric cylindrical portion whose axis is eccentric a predetermined amount from the rotational axis of the twist body and to coaxially and rotatably carry two rotational shafts which transmit rotational power respectively to the bend body and the swivel body. If this configuration is used, however, it may become practically difficult to assemble these long rotational shafts into the twist body, with the rotational shafts being held in coaxial relation. Particularly, it may not be easy and may result in taking a long time to assemble the rotational shafts directly into the eccentric cylindrical portion of the twist body.

Further, if the long rotational shafts for the bend and swivel bodies were disposed at a position which is eccentric from the rotational axis of the twist body, there may be raised a problem that the moment of inertia required to rotate the twist body has to be increased.

OBJECTS OF THE INVENTION

Accordingly, it is a primary object of the present invention to provide an improved industrial robot wherein the working range of a bend body can be enlarged, but nevertheless rotational shafts for driving a bend body and a swivel body can be easily assembled into a twist body and a rotary member carrying the twist body.

Another object of the present invention is to provide an improved industrial robot wherein the time taken to assemble a bend body drive shaft and a swivel body drive shaft into a twist body can be reduced.

A further object of the present invention is to provide an improved industrial robot wherein a wrist section of the robot is constructed as an assembly of several units which are completed independently of one another so that the assembling time can be shortened.

SUMMARY OF THE INVENTION

Briefly, according to the present invention, there is provided an industrial robot comprising an arm body, in which a rotary member is carried for rotation about a first axis. A twist body secured to one axial end of the rotary member carries a bend body for rotation about a second axis which is slanted with respect to the first axis, and a swivel body is in turn carried by the bend body for rotation about a third axis which is slanted with respect to the second axis. A first pair of shafts for transmitting driving power respectively to the bend body and the swivel body are carried in the twist body and are approximately coaxially rotatable about a fourth axis eccentric from the first axis. A second pair of shafts for respectively rotating the first pair of shafts are carried by the rotary member. One of the second pair of shafts is rotatable about the first axis, while the other of the second pair of shafts is rotatable about the fourth axis.

Since shafts for driving the bend and swivel bodies are divided into the first and second pairs of shafts, the lengths of the coaxially disposed first pair of shafts can be shortened, whereby the first pair of shafts can be easily assembled into the twist body. Further, since one of the second pair of shafts is disposed coaxially of the rotary member, the other of the second pair of shafts only is eccentric from the axis of the rotary member. This advantageously results in reducing the moment of inertia which is required to rotate the rotary member.

In another aspect of the present invention, a bearing casing is used so that the first pair of shafts can be assembled into the bearing casing outside the twist body. This makes it easy to assemble the first pair of shafts into the twist body. Furthermore, a wrist section of a robot according to the present invention is constructed as an assembly of several units. Since these units are completed independently of one another, the assembling of the wrist section becomes easy.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several view, and in which.

DETAILED DESCRIPTION OF THE PREFERRED EMBODIMENT

Figure 1:
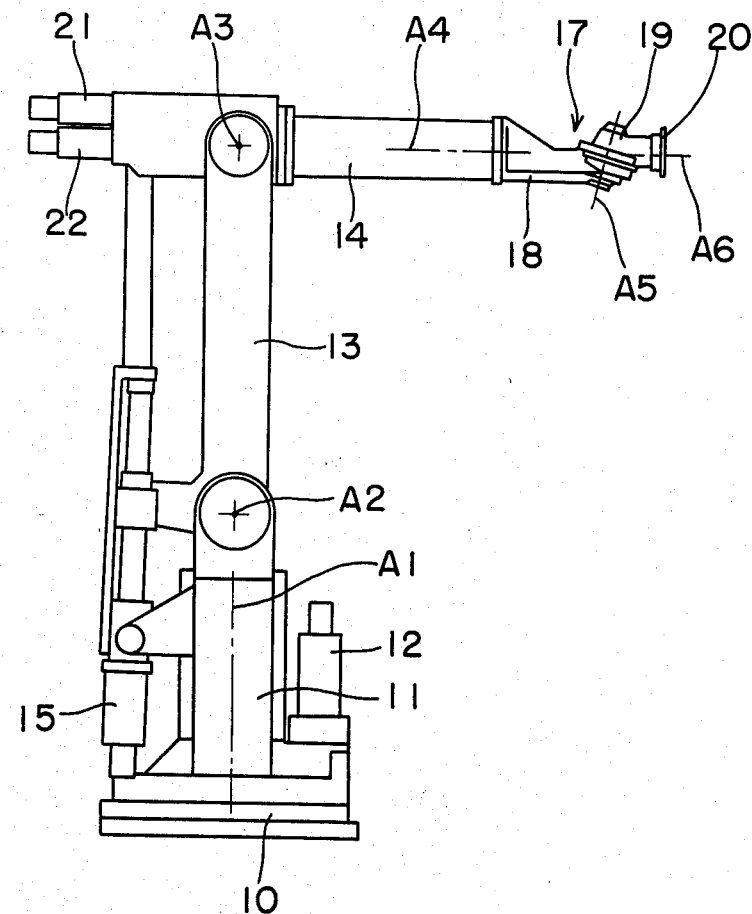
FIG. 1 is an elevational view of an industrial robot according to the present invention.

Referring now to the drawings and particularly to FIG. 1 thereof, an industrial robot according to the present invention is shown having a stationary base 10, on which a swivel base 11 is mounted to be rotatable by a first servomotor 12 about a vertical axis A1. A first arm 13 is carried on the swivel base 11 for pivot movement about a horizontal axis A2, and a second arm 14 is carried on an upper end of the first arm 13 for pivot movement about another horizontal axis A3 parallel to the horizontal axis A2. The first and second arms 13 and 14 are pivotally movable by a second servomotor 15 and a third servomotor (not shown) which are disposed on the swivel base 11 in parallel relation.

The second arm 14 is provided at its front end with a wrist 17 having a freedom of movements in three axes. More specifically, the wrist 17 is composed of a twist section 18, a bend section 19 and a swivel section 20. The twist section 18 is carried by the front end of the second arm 14 and is rotatable about an axis A4 normal to the horizontal axis A3. The bend section 19 is carried by the twist section 18 for rotation about an oblique axis A5 which is slanted with respect to the normal axis A4. The swivel section 20 is carried by the bend section 19 for rotation about an axis A6 which is slanted with respect to the oblique axis A5 so as to be brought into an axial alignment with the normal axis A4 when the bend section 19 is positioned at a single predetermined angular position about the oblique axis A5. These three wrist sections 18–20 are respectively rotatable by a fourth servomotor 21, a fifth servomotor 22 and a sixth servomotor (not shown) which are attached to a rear end surface of the second arm 14. Thus, the robot according to the present invention can be constructed as an articulated robot having a freedom of movements along six axes totally.

Figure 2:
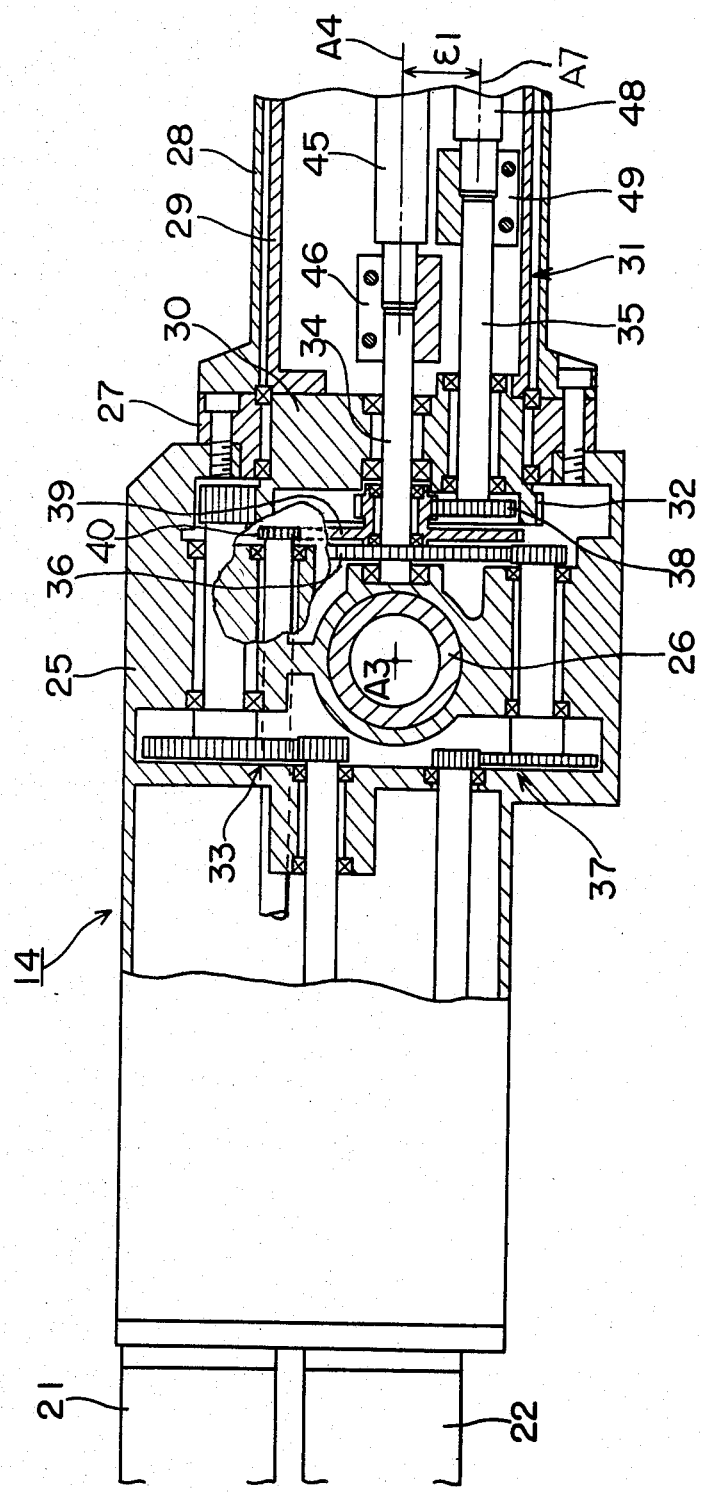
FIG. 2 is a sectional view of a second arm of the industrial robot.

The constructions of the second arm 14 and the wrist 17 will be described hereafter with reference to FIGS. 2 and 3. Referring now to FIG. 2, the second arm 14 comprises an arm body 25 fixed on a hollow pivot shaft. The hollow pivot shaft 26 is carried by the upper end of the first arm 13 to be rotatable about the horizontal axis A3. The arm body 25 has secured to its front side a support ring 27, to which a support sleeve 28 is in turn secured. The support sleeve 28 supports therein a rotary member 31 rotatable about the normal axis A4 which is perpendicular to the hollow pivot shaft 26. The rotary member 31 is composed of a cylindrical member 29 extending along the axis A4 and a bearing housing 30 secured to the rear end of the cylindrical member 29. The bearing housing 30 is formed with a large gear 32, which is in driving connection with the fourth servomotor 21 through a first reduction gear mechanism 33. The bearing housing 30 rotatably carries a first rotational shaft 34 coaxially of the rotary member 31 and also rotatably carries a second rotational shaft 35 rotatable about an axis A7 at a position which is offset by an amount ($\epsilon_1$) from the axis of the first rotational shaft 34. The first rotational shaft 34 is formed at its rear end with a gear 36, which is in driving connection with the fifth servomotor 22 through a second reduction gear mechanism 37. Similarly, the second rotational shaft 35 is formed at its rear end with a gear 38, which is drivingly connected with the sixth servomotor (not shown) through still another reduction gear mechanism including an idle gear 39 rotatably carried on the first rotational shaft 34 and a drive gear 40.

Figure 3:
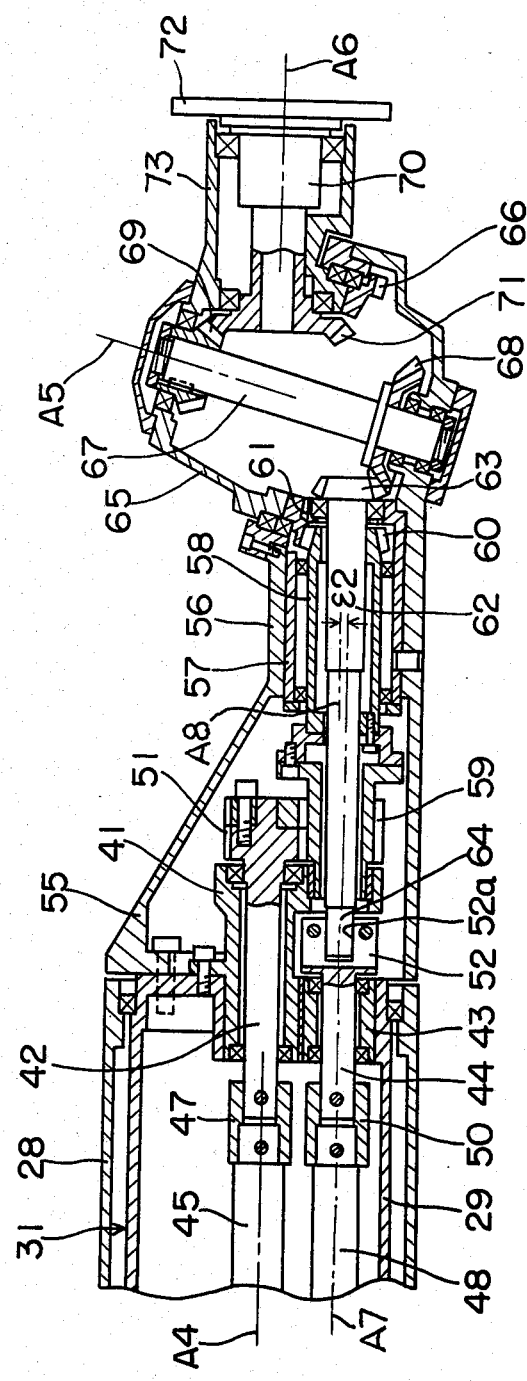
FIG. 3 is a sectional view of a wrist section of the industrial robot.

Referring now to FIG. 3, the rotary member 31 has secured at its front end a first bearing casing 41, in which a third rotational shaft 42 is rotatably carried in axial alignment with the first rotational shaft 34. The third rotational shaft 42 is formed with a gear 51 at its front end. The rotary member 31 has also secured to its front end a second bearing casing 43, in which a fourth rotational shaft 44 is rotatably carried in axial alignment with the second rotational shaft 35. The fourth rotational shaft 44 is formed at its front end with a shaft connecting portion 52 including a connecting hole 52a. The first and third rotational shafts 34, 42 which are axially spaced but in axial alignment with each other are interconnected by being coupled by means of couplings 46 and 47 to opposite ends of a first connecting rod 45. Similarly, the second and fourth rotational shafts 35, 44 are interconnected by being coupled by means of couplings 49 and 50 to opposite ends of a second connecting rod 48.

Figure 4:
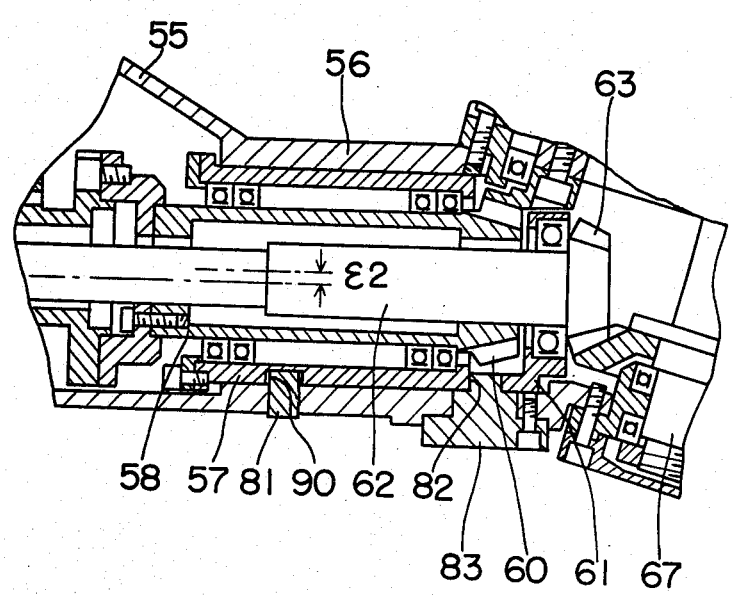
FIG. 4 is an enlarged fragmentary sectional view of a part of the wrist section.

A twist body 55 is secured to the front end of the rotary member 31 and is formed with an eccentric cylindrical portion 56 whose bore axis is approximately in axial alignment with the axis of the fourth rotational shaft 44. Fitted in the eccentric cylindrical portion 56 is a bearing casing 57, which is prevented from rotating by inserting a pin 81 into both a pinhole (not numbered) formed in the twist body 55 and a pinhole 90 formed in the bearing casing 57, as shown in FIG. 4. An engaging piece 83 secured to the twist body 55 is fitted in an engaging hole 82 formed in the bearing casing 57 at a position spaced from the pinhole 90. Thus, the bearing casing 57 is held in position in the eccentric cylindrical portion 56 of the twist body 55.

In the bearing casing 57, a hollow shaft 58 is carried for rotation about an axis A8 which is eccentric a minute amount ($\epsilon_2$) from the axis A7 of the fourth rotational shaft 44. A hollow gear 59 meshing with the gear 51 on the third rotational shaft 42 is secured to the rear end of the hollow shaft 58, and a bevel gear 60 is formed at the front end of the hollow shaft 58. The bearing casing 57 is formed at its front end with a bearing portion 61 which is radially inwardly reduced ahead of the bevel gear 60. A through shaft 62 passing through the hollow shaft 58 and the hollow gear 59 is rotatably carried by the bearing portion 61 in axial alignment with the fourth rotational shaft 44. The through shaft 62 is formed at its rear end with a connecting shaft portion 64, which is inserted into the connecting hole 52a in the shaft connecting portion 52 of the fourth rotational shaft 44 so as to be bodily connected with the shaft connecting portion 52. The through shaft 62 is formed with a bevel gear 63 at its front end.

Further, a bend body 65 is carried on the front portion of the twist body 55 for rotation about the oblique axis A5 which is slanted with respect to the rotational axis A4 of the rotary member 31. A bevel gear 66 meshing with the bevel gear 60 of the hollow shaft 58 is secured to the bend body 65. Opposite ends of an oblique shaft 67 rotatable about the oblique axis A5 are respectively carried by the twist body 55 and the bend body 65. The oblique shaft 67 fixedly carries a bevel gear 68 meshing with the bevel gear 63 of the through shaft 62 and also fixedly carries a bevel gear 69.

A swivel body 73 is carried on the front portion of the bend body 65 for rotation about an axis A6 which is slanted with respect to the oblique axis A5. The swivel body 73 includes a swivel shaft 70 carried by the bend body 65 and rotatable about the axis A6. The swivel shaft 70 is able to come into axial alignment with the rotational axis A4 of the rotary member 31 when the bend body 65 is positioned at a single predetermined angular position about the oblique axis A5. The swivel shaft 70 is formed at its rear end with a bevel gear 71 meshing with the bevel gear 69 keyed on the oblique shaft 67. The front end of the swivel shaft 70 is formed with a flange portion 72, to which various end effectors such as, for example, a handling device are selectively attachable depending upon an intended kind of work of the robot.

The assembling procedure of the wrist 17 will be described hereinafter. The wrist 17 is composed of a rotary unit 100 shown by the solid line in FIG. 5 and a twist unit 110 shown by the solid line in FIG. 6. The rotary unit 100 and the twist unit 110 are assembled independently of each other and then, are assembled bodily.

Figure 5:
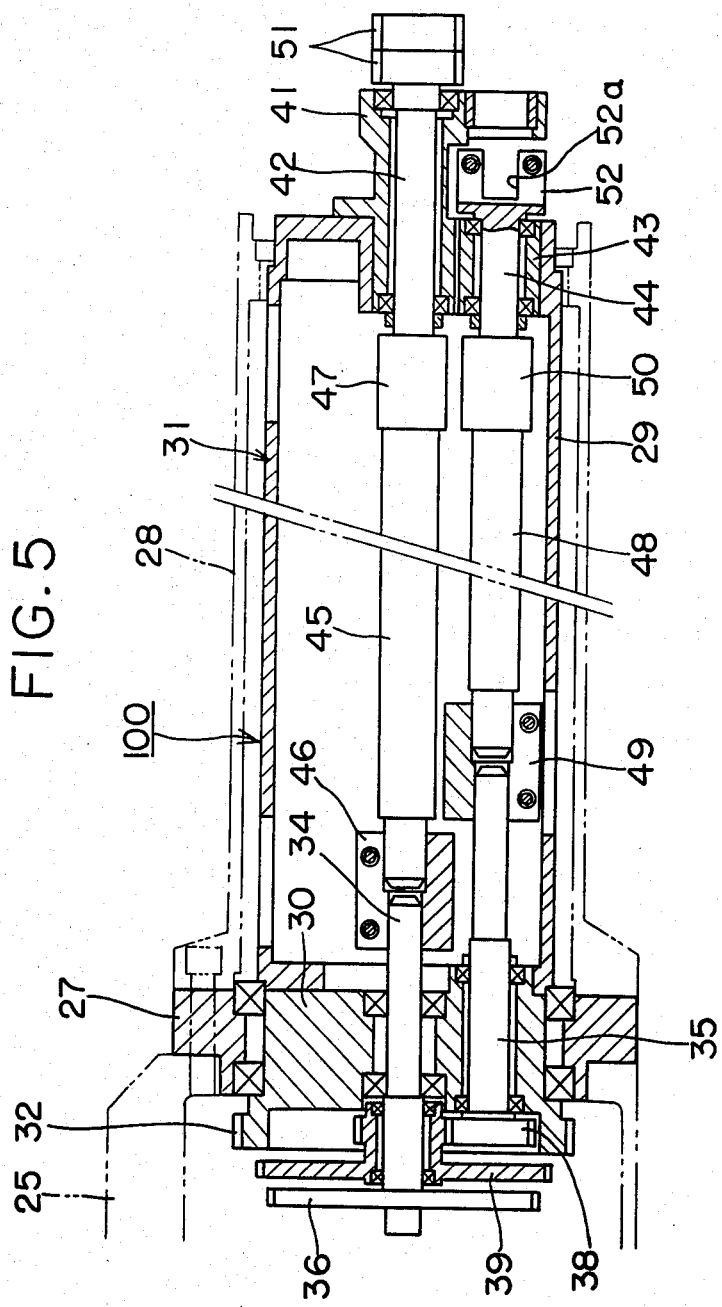
FIG. 5 is a sectional view of a rotary unit constituting the wrist section.

The assembling procedure of the rotary unit 100 will be described with reference to FIG. 5. First of all, the first and second rotational shafts 34, 35 are rotatably assembled into the bearing housing 30 when the same is not secured to the rear end of the cylindrical member 29. Similarly, the third and fourth rotational shafts 42, 44 are rotatably assembled into the first and second bearing casings 41, 43 when the same are not secured to the front end of the cylindrical member 29. Subsequently, the support ring 27 is assembled to be rotatable on the bearing housing 30, the couplings 46 and 49 are respectively fixed on the first and second rotational shafts 34, 35, and the bearing housing 30 is secured to the rear end of the cylindrical member 29. Further, the first and second connecting rods 45, 48 are respectively connected to the rear ends of the third and fourth rotational shafts 42, 44 through the couplings 47, 50. The first and second connecting rods 45, 48 are inserted into the cylindrical member 29 from the front side of the same to bring their rear ends into coupling connections respectively with the couplings 46 and 49, and then, the first and second bearing casings 41, 43 are secured to the cylindrical member 29. Bolts (not numbered) of the couplings 46, 49 are screwed up to bodily couple the first and second rotational shafts 34, 35 respectively with the first and second connecting rods 45, 48. The assembling procedure of the rotary unit 100 is completed in this manner.

Figure 6:
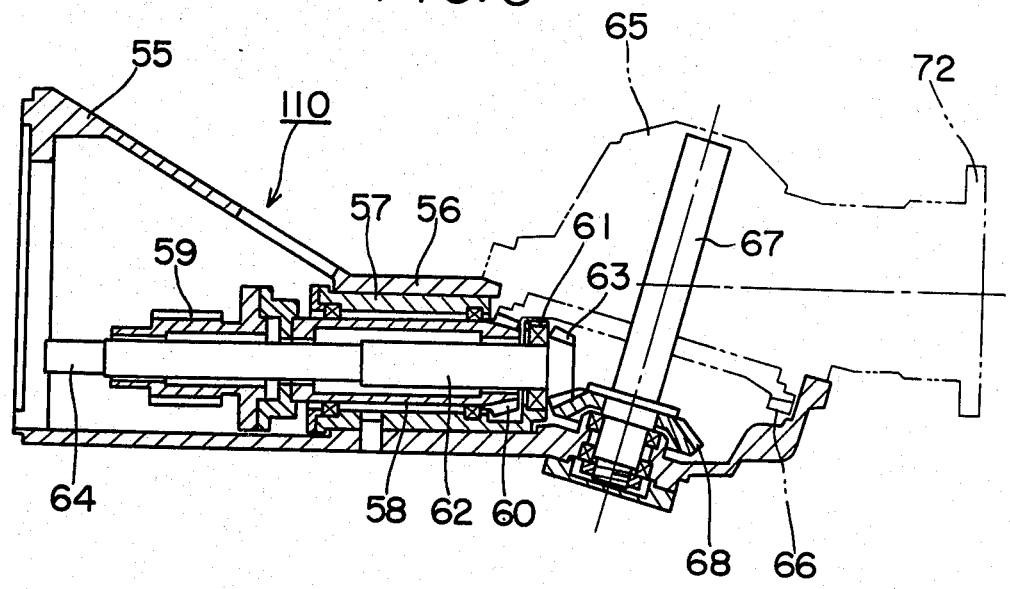
FIG. 6 is a sectional view of a twist unit constituting the wrist unit.

The assembling procedure of the twist unit 110 will be described hereafter with reference to FIGS. 4 and 6. First of all, the hollow shaft 58 is assembled to be rotatable in the bearing casing 57 outside the twist body 55, and the hollow gear 59 is secured to the rear end of the hollow shaft 58. The through shaft 62 with the bevel gear 63 is inserted into the hollow shaft 58 and the hollow gear 59 and is assembled to be rotatably carried by the front bearing portion 61 of the bearing casing 57. On the other hand, the oblique shaft 67 having the bevel gear 68 secured thereto is assembled to be rotatably carried by the twist body 55, in which state the bearing casing 57 together with the hollow shaft 58 and the through shaft 62 already assembled therein is inserted into the twist body 55 from the rear side thereof until the bevel gear 63 on the through shaft 62 is brought into meshing engagement with the bevel gear 68 on the oblique shaft 67. Then, the pin 81 is inserted into the pinhole 90 from the outside of the twist body 55, and the engaging piece 83 is fitted in the engaging hole 82 from the outside of the twist body 55. The engaging piece 83 is then secured to the twist body 55 with bolt (unnumbered), whereby the bearing casing 57 is held in position in the eccentric cylindrical portion 56. The assembling of the twist unit 110 is completed in this manner.

Thereafter, the bend body 65 in which swivel shaft 70 has been rotatably assembled is assembled to the twist unit 110 rotatably about the oblique shaft 67. The bevel gear 69 is secured on the oblique shaft 67 in meshing engagement with the bevel gear 71 on the swivel shaft 70.

The rotary unit 100 and the twist unit 110 including the bend body 65 are assembled independently of each other in the manner as described above. Subsequently, the support ring 27 rotatably carrying the rotary unit 100 is secured to the arm body 25, whereby the rotary member 31 is rotatably carried by the arm body 25. Then, the support sleeve 28 is secured to the arm body 25 to cover the rotary member 31, and the front end of the rotary member 31 is rotatably carried by the front end of the support sleeve 28 through a bearing (not numbered). Following this, the twist unit 110 is moved toward the front end of the rotary unit 100 to bring the hollow gear 59 into meshing engagement with the gear 51 on the third rotational shaft 42 and to bring the connecting shaft portion 64 into fitting engagement with the connecting hole 52a in the shaft connecting portion 52 at the front end of the fourth rotational shaft 44. In this state, the twist body 55 is secured to the front end of the rotary member 31, and bolts (not numbered) in the shaft connecting portion 52 are screwed in to bodily couple the fourth rotational shaft 44 with the through shaft 62.

Obviously, numerous modifications and variations of the present invention are possible in light of the above teachings. It is therefore to be understood that within the scope of the appended claims, the present invention may be practiced otherwise than as specifically described herein.

What is claimed is:

1. An industrial robot comprising:
   (a) an arm body (25);
   (b) a rotary member (31) carried on said arm body (25) for rotation about a first axis (A4);
   (c) a twist body (55) secured to one axial end of said rotary member (31);
   (d) a bend body (65) carried by said twist body (55) for rotation about a second axis (A5) which is slanted with respect to said first axis (A4);
   (e) a swivel body (73) carried by said bend body (65) and comprising a swivel shaft (70), said swivel shaft (70) rotating about a third axis (A6) which is slanted with respect to said second axis (A5);
   (f) a first shaft (62) carried in said twist body (55) and rotatable about a fourth axis (A7) parallel to and eccentrically spaced (E1) with respect to said first axis (A4) for transmitting driving power to said swivel body (73);
   (g) a second shaft (58) carried in said twist body (55) and rotatable about a fifth axis (A8) parallel to and eccentrically spaced (E2) with respect to said fourth axis (A7) for transmitting driving power to said bend body (65);
   (h) a third shaft (35) rotatably carried by said rotary member (31) for rotating said first shaft (62); and
   (i) a fourth shaft (34) rotatably carried by said rotary member (31) for rotating said second shaft (58), said fourth shaft (34) being coaxial with and rotatable about said first axis (A4).

2. An industrial robot as set forth in claim 1, wherein:
   (a) said twist body (55) is formed with an eccentric cylindrical bore the axis of which is said fifth axis (A8)
   (b) a bearing casing (57) is received in said eccentric cylindrical bore;
   (c) said bearing casing (57) rotatably journals said second shaft (58); and
   (d) said bearing casing (57) is secured to said twist body (55).

3. An industrial robot as set forth in claim 1, wherein:
   (a) a rotary unit (100) is constituted by said rotary member (31) and said third (35) and fourth (34) shafts assembled therein;

(b) a twist unit (110) is constituted by said twist body (55) and said first (62) and second (58) shafts assembled therein; and (c) said rotary unit (100) is assembled to said arm body (25) and said twist unit (110) is in turn assembled to said rotary unit (100).

4. An industrial robot as set forth in claim 3, wherein said rotary unit (100) further comprises:

(a) first to third input gears (32, 38, 36) provided on ends of said rotary member (31), said third shaft (35), and said fourth shaft (34), respectively;

(b) an output gear (51) provided on the other end of said fourth shaft (34); and (c) shaft connecting means (52) provided on the other end of said third shaft (35);

(d) said rotary unit (100) being completed by assembling to said rotary member (31) said third shaft (35), said fourth shaft (34), said first to third input gears (32, 38, 36), said output gear (51), and said shaft connecting means (52).

5. An industrial robot as set forth in claim 4, and further comprising:

(a) first to third drive gears (33, 40, 37) rotatably carried in said arm body (25) for driving engagements respectively with said first to third input gears (32, 38, 36) of said rotary unit (100);

(b) said rotary unit (100) being assembled to said arm body (25).

6. An industrial robot as set forth in claim 5, wherein said twist unit (110) further comprises:

(a) a first drive bevel gear (60) provided on said second shaft (58) for rotating said bend body (65);

(b) a second drive bevel gear (63) provided on said first shaft (62) for rotating said swivel body (73); and (c) a transmission gear (59) provided on said second shaft (58) and meshing with said output gear (51) of said rotary unit (100);

(d) said twist unit (110) being completed by assembling to said twist body (55) said first shaft (62), said second shaft (58), said first and second drive bevel gears (60, 63), and said transmission gear (59).

7. An industrial robot as set forth in claim 6, wherein said twist unit (110) is assembled to said rotary unit with said transmission gear (59) meshing with said output gear (51) and with said first shaft (62) being drivingly coupled with said shaft connecting means (52).

8. An industrial robot as set forth in claim 7, and further comprising:

(a) a first driven bevel gear (66) secured to said bend body (65) and meshing with said first drive bevel gear (60);

(b) an oblique shaft (67) carried by said twist body (55) and rotatable about said second axis (A5) for transmitting driving power to said swivel body (73); and (c) a second driven bevel gear (68) secured to said oblique shaft (67) and meshing with said second drive bevel gear (63).

* * * * *